(12) United States Patent
Yawitz et al.

(10) Patent No.: US 8,051,385 B1
(45) Date of Patent: Nov. 1, 2011

(54) CONTENT SELECTION AND AGGREGATED SEARCH RESULTS PRESENTATION ON A HANDHELD ELECTRONIC DEVICE

(75) Inventors: Mitchell A. Yawitz, Belmont, CA (US); Gregg E. Zehr, Los Gatos, CA (US); Symon J. Whitehorn, Sausalito, CA (US)

(73) Assignee: Amazon Technologies, Inc., Incline Village, NV (US)

( * ) Notice: Subject to any disclaimer, the term of this patent is extended or adjusted under 35 U.S.C. 154(b) by 1329 days.

(21) Appl. No.: 11/277,885

(22) Filed: Mar. 29, 2006

(51) Int. Cl.
*G06F 3/17* (2006.01)
*G06F 3/14* (2006.01)
*G06F 17/00* (2006.01)

(52) U.S. Cl. ............... 715/776; 715/202; 715/500.1; 715/781; 703/24; 707/3; 707/741

(58) Field of Classification Search .......... 715/200–277, 715/500.1, 781; 700/701–799, 800–866; 703/24; 707/3, 741; 705/50–79; 345/30–111, 345/173
See application file for complete search history.

(56) References Cited

U.S. PATENT DOCUMENTS

| 5,566,098 | A | 10/1996 | Lucente et al. |
| 5,663,748 | A | 9/1997 | Huffman et al. |
| 5,847,698 | A | 12/1998 | Reavey et al. |
| 5,950,214 | A * | 9/1999 | Rivette et al. ............... 715/202 |
| 7,009,596 | B2 | 3/2006 | Seet et al. |
| 7,190,351 | B1* | 3/2007 | Goren ........................ 345/173 |
| 7,222,306 | B2* | 5/2007 | Kaasila et al. ............... 715/801 |
| 7,298,851 | B1 | 11/2007 | Hendricks et al. |
| 7,304,635 | B2 | 12/2007 | Seet et al. |
| 7,716,224 | B2* | 5/2010 | Reztlaff et al. ............. 707/741 |
| 2003/0115038 | A1* | 6/2003 | Want et al. ................. 703/24 |
| 2005/0283734 | A1* | 12/2005 | Santoro et al. .............. 715/765 |
| 2006/0277454 | A1* | 12/2006 | Chen ........................ 715/500.1 |
| 2006/0281058 | A1 | 12/2006 | Mangoaela |
| 2008/0243788 | A1* | 10/2008 | Reztlaff et al. ................ 707/3 |
| 2008/0295021 | A1* | 11/2008 | Nguyen et al. ............. 715/781 |
| 2011/0047498 | A1* | 2/2011 | Hendricks ................. 715/776 |

* cited by examiner

*Primary Examiner* — Ruay Ho
(74) *Attorney, Agent, or Firm* — Lee & Hayes, PLLC (57) ABSTRACT

An electronic device includes a content display for presenting content. The electronic device also includes a control display for enabling selection of a portion of the content. The content includes a plurality of items. The control display also enables a plurality of respective batch operations to be performed on the items.

43 Claims, 6 Drawing Sheets

CONTENT SELECTION AND AGGREGATED SEARCH RESULTS PRESENTATION ON A HANDHELD ELECTRONIC DEVICE

CROSS-REFERENCE TO RELATED APPLICATIONS

This patent application is related to U.S. patent application Ser. No. 11/277,893, titled "Handheld Electronic Book Reader Device Having Dual Displays", the contents of which are incorporated herein by this reference as if set forth verbatim herein. This patent application and the above noted utility application were filed concurrently on the same day of 29 Mar. 2006.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information, such as books, using electronic technologies. Books distributed using electronic technologies are commonly referred to as electronic books ("eBooks"). Various entities make eBooks available for download over ordinary Internet connections, such as broadband and dialup connections.

EBook reader devices attempt to mimic the experience of reading a conventional paper book through the display of electronic information on one or more electronic displays. A typical eBook reader device is a handheld digital device having a liquid crystal display panel and enough memory and processing capability to store several eBooks. Such a device is capable of retrieving and displaying an eBook or portion of an eBook for reading.

There are some advantages to using an eBook reader device over conventional paper books. An eBook reader device is often capable of storing a number of complete unabridged eBooks. Therefore, an eBook reader containing a number of stored eBooks weighs significantly less than the same number of paper books. This makes an eBook reader a particularly attractive alternative to paper books for travel, educational purposes, and professional business use. Also, because eBooks do not require the use of paper products, they may be offered at a lower price than their paper book counterparts. Furthermore, the use of eBook reader devices in conjunction with eBooks may be beneficial to the ecosystem, by reducing a number of books produced using paper products.

To date, however, eBook readers and the use of eBooks in general have not achieved widespread consumer acceptance. This is most likely attributable to the design and implementation particulars of conventional eBook reader devices. Additionally, such readers may have limited means for selection, input, and control. For example, these readers may not enable users to select particular words on a per-item basis, owing to the design of their user interfaces. Thus, if a user sees an interesting item in the text, and wishes to learn more about it, he or she may need to access another device to obtain more information about the item. For example, the user may access a personal computer (PC) to obtain this information.

As such eBook readers continue to evolve, there remains a need for improving a reader's ability to obtain additional information about items of interest using the reader itself, and without accessing other devices.

SUMMARY

An electronic device includes a content display for presenting content. The content includes a plurality of items. The electronic device also includes a control display for enabling selection of a portion of the content. The control display further enables a plurality of respective batch operations to be performed on the items.

BRIEF DESCRIPTION OF THE DRAWINGS

The same numbers are used throughout the disclosure and figures to reference like components and features. The first digit of a reference number indicates the drawing figure in which that reference number is introduced.

DETAILED DESCRIPTION

The following document describes a handheld electronic book reader. More particularly, various aspects of its configuration and capabilities for performing aggregated look-ups are described herein. These and other aspects are described below in various example implementations of an electronic device that presents electronic books, news print, electronic magazines, RSS feeds, or other forms of media content. More specifically, the description herein provides a non-limiting implementation of an electronic device in the form of an electronic book reader device.

The terms "book" and/or "eBook" as used herein include electronic or digital representations of printed works, as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, etc. Accordingly, the terms book and/or eBook may include any content that is in electronic or digital format.

With such eBooks, the content may be structured as virtual frames presented on the device and a user may turn or change from one virtual frame or "page" of electronic content to another. It is further noted that various aspects and features described herein may be implemented in other electronic devices or electronic readers besides eBook reader devices including, for example, portable computers, personal digital assistants (PDAs), portable gaming devices, wireless phones, and the like.

Figure 1:
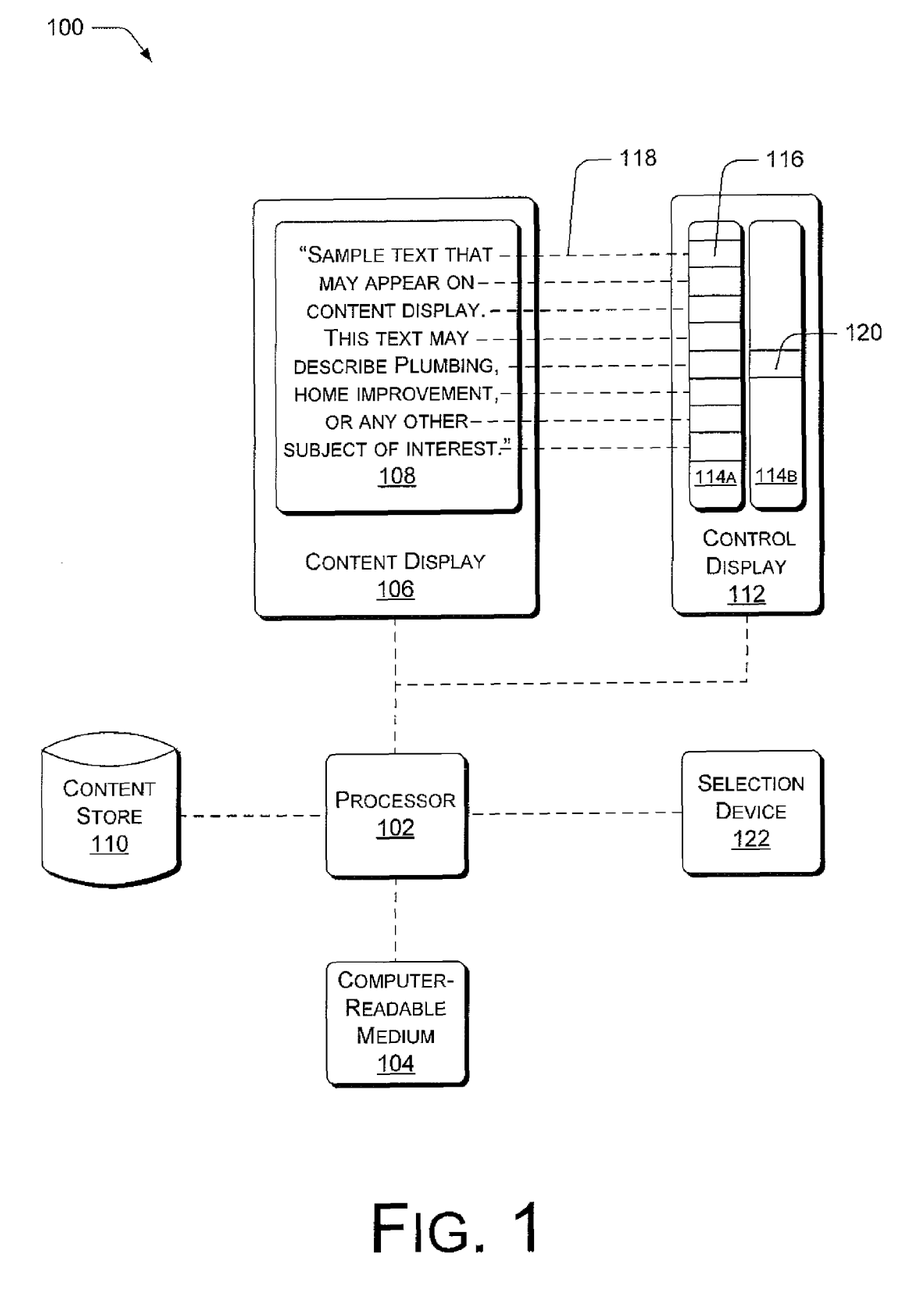
FIG. 1 is a block diagram of a handheld electronic book reader as it may present illustrative content.

FIG. 1 shows a handheld electronic book reader 100. The block diagram presented in FIG. 1 is understood not to depict the components of the reader to scale, but instead illustrates various components of the reader in more schematic form.

As shown, the reader 100 may include a processor 102 that communicates with a computer-readable or machine-readable medium 104. The processor 102 may be operative to read from and/or write to the medium 104 when performing any of the functions or processes described herein. The processor 102 may be of any suitable architecture or configuration, chosen as appropriate for implementing the description herein.

The medium 104 may store executable instructions written in any suitable programming language. The instructions, when executed, may direct the handheld electronic book reader, or more specifically, the processor, to perform any of the operations described herein. The medium may also store data related to performing such operations.

The reader 100 has a content display 106 that presents textual or graphical data in a human-readable format to a user. In some implementations, the content display 106 may be implemented using display technology that provides a relatively slow refresh rate, in exchange for a relatively low rate of power consumption. This tradeoff may serve to maximize battery life. Since the device 100 is an electronic book, it will typically display relatively static content to the user via content display. In this operational context, a slow-refresh rate technology may be suitable for implementing the content display. In some possible implementations, the display screen may not be directly responsive to user input.

Sample text 108 is shown displayed on the content display 106. It is understood that this sample text 108 is illustrative and non-limiting, and that the sample text is included only to facilitate the description provided herein. The sample text 108 may be considered a portion of an electronic book presented by the reader, and may be stored in and read from, for example, a data store 110. The processor 102 may be operative to read content (e.g., the sample text 108) from the data store 110 and render the content onto the content display 106.

Assuming that the content display 106 is implemented in a reader that is handheld or portable, the content display may be relatively small in size. Owing to this small size, or to other design factors related to providing the reader, the sample text 108 may not be readily selectable by the user on a per-word basis. In contrast, for example, in the context of a word processing application running on a fully-featured personal computer, a user may be able to select any item (e.g., a word), either in whole in part. The sample text 108 shown in FIG. 1 may be arranged in a plurality of rows for convenient presentation on the content display. As described in further detail below, the reader 100 enables selection of, for example, a row of the sample text, and also enables an operation to be performed automatically in batch on each word of interest appearing within the row.

The reader 100 may also provide a control display 112 as shown in FIG. 1. The control display 112 may be aligned alongside the content display 106, and may be logically organized into two columns 114A and 114B. The column 114A may include a graphic element 116 corresponding to each row in the sample text 108, shown in the content display 106. For example, these graphic elements 116 may be implemented as shaded boxes. However, it is noted that the elements 116 may be implemented using any suitable graphic elements or other identifiers that may fit within the column 114A. The elements 116 may be implemented by assigning a given value to a plurality of pixels, for example, such that the pixels as a whole convey some visual or perceptible element to the user.

FIG. 1 illustrates the content display 106 and the control display 112 as separate elements only for convenience of illustration and description, and not to limit possible implementations of the description herein. In some instances, the content display 106 and the control display 112 may be implemented as separate elements, as shown in FIG. 1. In other instances, the content display 106 and the control display 112 may be implemented as a single display, with separate control systems for driving the content display 106 and the control display 112.

The relationships between the rows in the sample text 108 and the corresponding elements 116 in the column 114A are represented in FIG. 1 by the dashed lines 118 shown between the content display 106 and the control display 112. In certain implementations, the height of the graphic elements 116 may vary depending on the height of the text or other content appearing in the respective rows of the sample text 108.

The column 114B may provide space for a cursor 120 that is similar in number and configuration to the elements 116 shown in column 114A. The cursor 120 may be implemented as a graphic element, and may be moved vertically within the space defined by the column 114B to rest alongside one of the elements 116. If the cursor 120 is placed alongside a given element 116, the row of text corresponding to the given element 116 may be considered to be "in focus". The element 116 that is in focus is then eligible for selection, as described below.

The reader may provide a selection device 122 that enables the user to move the cursor 120 within the column 114B. In general, the selection device 122 may be used to select the element 116 that is in focus, as described above. In example implementations, the selection device 122 may be implemented as a thumbwheel or other convenient rotary device. The selection device may also be implemented as a toggle switch that is movable vertically to cause corresponding movement of the cursor 120. Also, the selection device may be implemented as a solid-state or electronic sensor that detects a pre-defined user action as a command to move the cursor 120. The selection device 122 may also be equipped with a click function for selecting the element that is in focus. For example, the thumbwheel or rotary device may also be a click wheel. In any event, the selection device may be coupled to communicate signals with the processor 102. In turn, the processor updates the control display 112 in response to signals from the selection device. More particularly, the processor may update the position of the cursor 120 within the column 114B.

FIG. 1 illustrates how the reader 100 may present options relating to a selected row of the text presented in the content display 106. Only for the purposes of describing FIG. 1, and not for limitation, the cursor 120 is shown positioned to select the row of sample text corresponding to the element 116. Thus, in the illustrative configuration shown in FIG. 1, the row containing sample text "describe plumbing" has been selected, for example, by moving the cursor 120 within the column 114B using the selection device 122.

Figure 2:
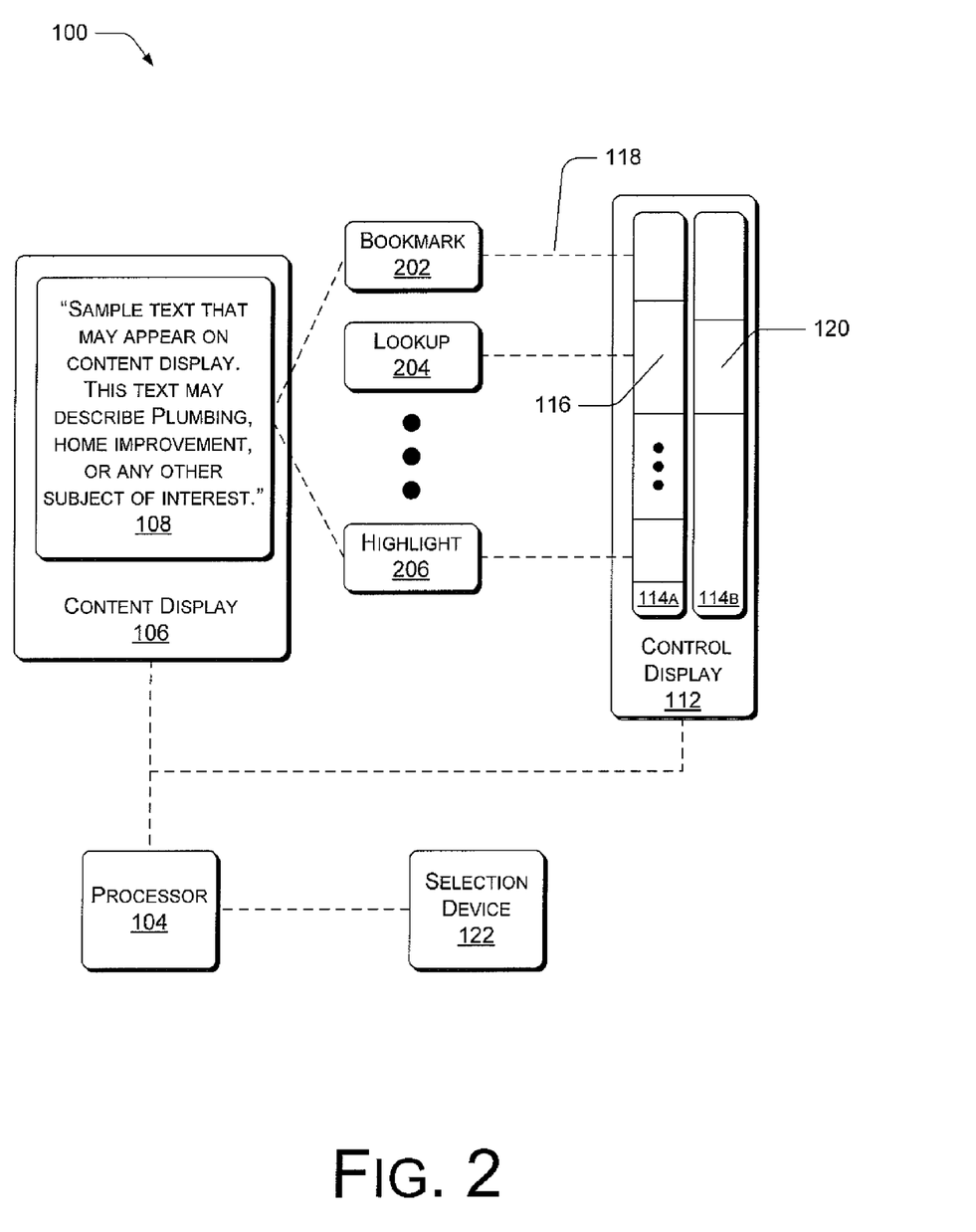
FIG. 2 is a block diagram of the reader as it may present processing options that are available for a logical unit of the content.

Turning to FIG. 2, once one of the rows of sample text 108 has been selected, a plurality of processing options may be presented to the user. Several illustrative options are shown in FIG. 2. For example, option block 202 represents associating a bookmark or other index element with the selected row of text. Option block 204 represents performing a lookup operation on the selected row of text. Option block 206 represents highlighting or otherwise altering one or more visual characteristics of the selected text. The option blocks 202-206 are shown only for convenience of description. However, it is understood that other options may also be presented without departing from the scope and spirit of the description herein. It is also understood that implementations of the description herein need not include all of the options shown in FIG. 2. The illustrative nature of the options 202-206 is conveyed by the ellipsis shown in FIG. 2.

For convenience only, the blocks 202-206 are shown to the side of the content display 106. However, it is understood that graphic representations of the blocks 202-206 may be overlaid onto the content already presented on the content display 106. Additionally, the elements 116 and the cursor 120 as presented in the columns 114A and 114B may also be updated to correspond to the graphic representations of the blocks 202-206. This updated correspondence is represented by the dashed lines 118 shown in FIG. 2. In this manner, the control display 112 may enable the user to select of the options represented by the blocks 202-206. More particularly, the user may interact with the selection device 122 select one of the options represented by the blocks 202-206 by moving the cursor 120 to the selected option. For example, the cursor 120 is shown in FIG. 2 so as to select the lookup function 204, which is now described with FIG. 3.

Figure 3:
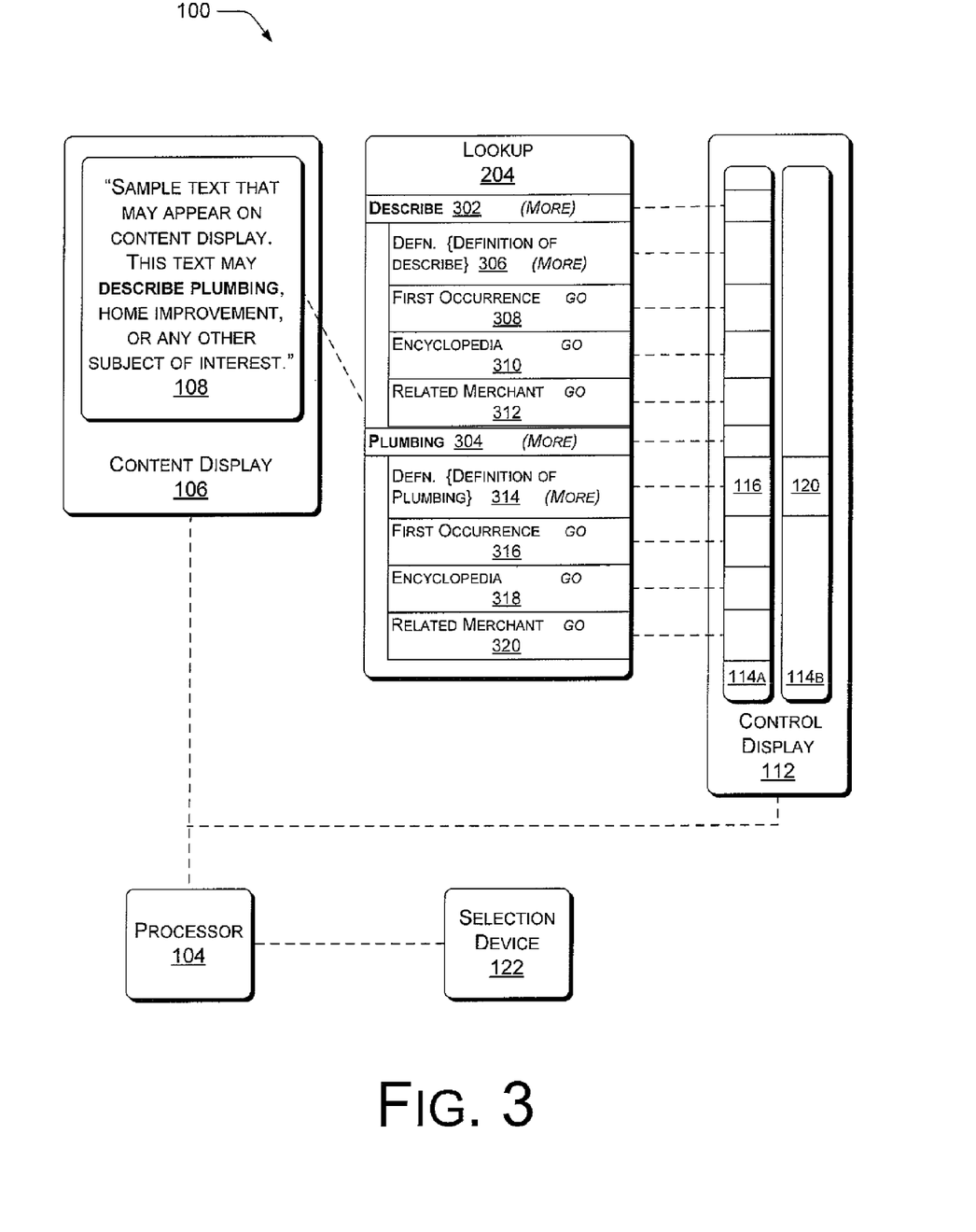
FIG. 3 is a block diagram of the reader as it may present aggregated information related to all items of interest in a logical unit of the content.

FIG. 3 illustrates how the reader 100 may present information related to all text of interest in a selected row of sample text. Before FIG. 3 is described in detail, recall that in FIG. 1, the row of sample text containing "describe plumbing" was selected. Recall also that in FIG. 2, a lookup operation was requested for the selected row of text. FIG. 3 illustrates example results of the lookup operation that was requested in FIG. 2.

Turning to FIG. 3 in more detail, the option block 204 is expanded to include illustrative results of the lookup operation. Given the example row of text, the reader 100 may perform a lookup operation on each item or token of potential interest appearing in the row of text. For example, words such as "the", "a", "an", or the like may be compiled into a list and excluded as items of potential interest. The items of potential interest that survive such an exclusion process may be termed, for convenience only, as tokens on which further operations may be performed.

As noted above, the reader 100 may not enable the user to select each item appearing in the content display 106 on a per-item basis. However, the reader 100 may enable the user to select collections of the items. Examples of such collections of items are the rows of text appearing in the content display 106. The reader 100 may then perform some operation on each item appearing within the selected collection. Put differently, the reader 100 may perform aggregated operations on all items appearing in the selected collection. For example, the reader 100 may perform aggregated lookup operations on the input text "describe plumbing", resulting in a discrete lookup operation being performed on the tokens "describe" and "plumbing". The reader then aggregates the results from the two discrete lookup operations, and presents the aggregated lookup results to the user. FIG. 3 illustrates an example of such aggregated lookup results in option block 204, which is now described in detail.

In the illustrative implementation shown in FIG. 3, the block 204 may include respective areas 302 and 304 that contain the results of the two discrete lookup operations performed for the tokens "describe" and "plumbing". Turning first to the area 302, it may include a field 306 that provides a definition of the corresponding token, in this case, the verb "describe". A field 308 may indicate where the corresponding token ("describe") first appears within the content presented in the content display 106. A field 310 provides a link or pointer to an encyclopedia entry for the corresponding token ("describe"). Finally, a field 312 provides a link or pointer to a merchant who may offer products or services related to the corresponding token ("describe").

Similarly, the area 304 may include a field 314 that provides a definition for the corresponding token, in the case, the term "plumbing". A field 316 indicates where the corresponding token ("plumbing") first appears within the content presented in the content display 106. A field 318 provides a link or pointer to an encyclopedia entry for the corresponding token ("plumbing"). Finally, a field 320 provides a link or pointer to a merchant who may offer products or services related to the corresponding token ("plumbing").

In some instances, text or other content presented in the areas 302 and 304, and the fields 306 and 314, may be truncated to fit into these areas or fields. For example, only a summary, synopsis, or title of such content may fit legibly into the area. In such instances, an icon or other feature may indicate that the text or other within a given area has been truncated, and that an expanded form the text is available, if the user wishes to see it. In the areas 302 and 304, the text "MORE" provides a non-limiting example of such an icon. For example, if the user wishes to expand the description contained within the field 302, he or she can move the cursor 120 to align with the field 302, and select this field. Afterwards, the expanded form of the content available in the field 302 may be overlaid onto the content display 106.

The fields 308-312 and the fields 316-320 each include the illustrative text "GO" to indicate that the user may "jump" to another location by selecting the appropriate field with the cursor 120. For example, the fields 308 and 316 point to where the terms "describe" and "plumbing" first occur in, for example, a given electronic book. If the user wishes to see where one of these terms first occurs in the given electronic book, the user may select the appropriate field 308 or 316 with the cursor 120. Similarly, if the user wishes to access an encyclopedia entry for one of these terms, the user may select the appropriate field 310 or 318, both of which include the text "GO". Finally, if the user wishes to browse products or services offered by one or more merchants that are relevant to one of these terms, the user may select the appropriate field 312 or 320, both of which include the text "GO".

It is noted that the information used to populate the fields shown in the areas 302 and 304 may be stored locally on the reader 100, or may be retrieved from a source remote to the reader 100. For example, the reader 100 may include a remote communication unit that enables it to exchange data with data sources external to the reader.

As described above, the control display 112 may be updated according to the data presented in the content display 106. More particularly, assuming that items similar to those shown in block 204 are overlaid onto the content display 106, the columns 114A and 114B may be updated as shown in FIG. 3. Additionally, graphic elements representing the various elements 116 in the column 114A may be sized according to the heights of the corresponding items 302-320. Finally, in response to user input via the selection device 122, the cursor 120 may be moved vertically within the column 114B to align with different ones of the elements 116. As the cursor 120 is aligned with elements 116 having different heights, the height of a graphic element representing the cursor 120 may change so as to match that height of a graphic element representing the element 116 with which it is aligned.

It is noted that as shown in FIG. 3, the cursor 120 is positioned to align with the element 116 corresponding to field 314. Recall that field 314 contains an entry for a dictionary definition of the term "plumbing". By selecting the field 314 with the cursor 120, the user can expand the definition of the term "plumbing", which definition in turn may be overlaid onto the content display 106. In this manner, the user may select from among the aggregated results of the various lookup operations performed on each token of interest in the selected collection of the sample text 108. Additionally, the reader 100 as described herein enables the user to select and receive information on a per-item basis, even though the content display 106 may not itself such per-item selection.

Having described an example flow of several user interfaces that may be presented to the user, the description now turns to a more detailed discussion of illustrative components that may be included in the reader 100. This discussion is now presented in FIG. 4.

Figure 4:
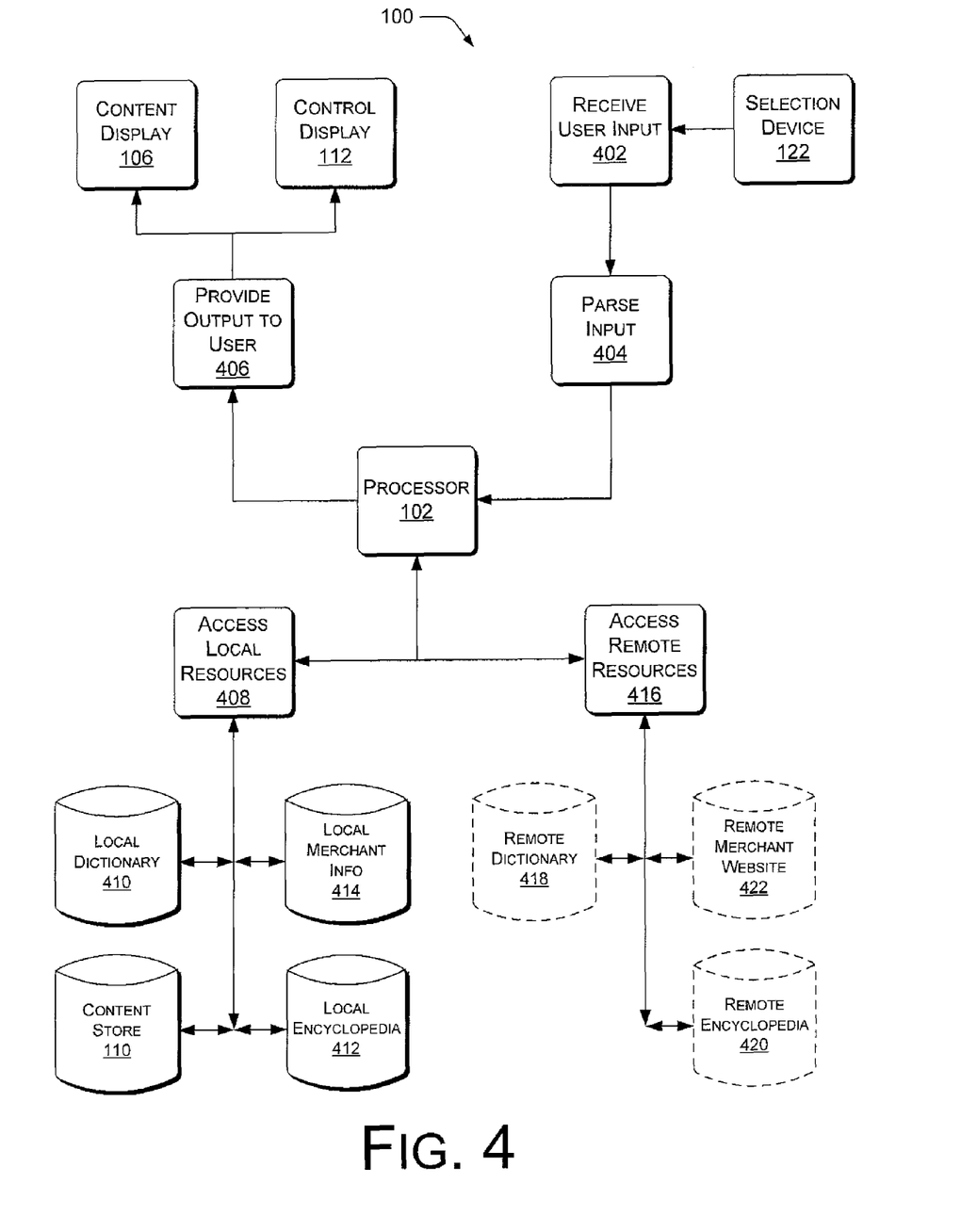
FIG. 4 is a block diagram of illustrative components of the reader.

FIG. 4 illustrates in block form several components of the reader 100. Some components shown in FIG. 1 have been illustrated and described above, and these components are referenced using the same reference signs as before. Other components are referred to as functional blocks, which may be implemented as hardware, software, or any combination of the two.

The processor 102 may interact with a functional block 402 to receive input from the user. For example, the functional block 402 may include device drivers suitable for interfacing the selection device 122 or other user input devices to the processor 102. Non-limiting examples of input that may be received from block 402 are any of the lines or rows of sample text 108 shown in FIGS. 1-3 above. The user may select these lines of text for processing using the selection device 122 or other user input devices.

A functional block 404 may be operative to parse or deconstruct the input received from block 402. For example, block 404 may extract tokens of interest from a selected line of the sample text 108. These tokens may then be passed to the other functional blocks described below.

The processor 102 may interact with a functional block 406 to provide output to the user. For example, the functional block 406 may include device drivers suitable for interfacing the content display 106 and/or the control display 112 to the processor 102.

The processor 102 may interact with a functional block 408 to access local resources hosted on the reader 100. For example, the functional block 408 may include software and/or hardware suitable for accessing local information used to populate the areas 302 and 304 and the various fields 306-320, as shown in FIG. 3.

As an example, the definition fields 306 and 314 may be populated with information stored in a local dictionary 410. The first occurrence fields 308 and 316 may be populated with information stored in the content store 110. The encyclopedia entry fields 310 and 318 may be populated with information stored in a local encyclopedia 412. The related merchant fields 312 and 320 may be populated with information stored in a local merchant storage unit 414. The local merchant storage unit 414 may be implemented as a local cache that is loaded periodically from remote sources, such as merchant websites.

The processor 102 may interact with a functional block 416 to access resources hosted remotely from the reader 100. For example, the functional block 416 may include software and/or hardware suitable for accessing remote information used to populate the areas 302 and 304 and the various fields 306-320, as shown in FIG. 3. As such, the functional block 416 may represent any modems or other network interface devices that enable the reader 100 to communicate with external data sources, as well as related software. For example, the functional block 416 may include adapters suitable for interfacing the device to wire-based or wireless networks.

As an example, the definition fields 306 and 314 may be populated with information accessed from a remote dictionary 418. The encyclopedia entry fields 310 and 318 may be populated with information accessed from a remote encyclopedia 420. The related merchant fields 312 and 320 may be populated with information accessed from a remote merchant website 422. The remote status of the dictionary 418, the encyclopedia 420, and the merchant website 422 are conveyed by the dashed outlines in their representations in FIG. 4.

For convenience of illustration only, FIG. 4 shows one instance of the local and remote resources. However, implementations of the description herein could include any number of these various local or remote resources. The reader 100 may select from among these multiple local or remote resources, or may utilize all of these local or remote resources. In any event, it is noted that the functional block 416 may pass the tokens of interest to these various local and/or remote resources as search input. In turn, the local and/or remote resources may return the results of these searches to the functional block 416. Then, the functional block 416 may present these results to the processor 102, which may then route the results to the content display via functional block 406.

The dictionary, the encyclopedia, other reference works, or the local or remote resources described above may be accessible to the processor 102. Additionally, any of the foregoing resources may be offered as a service against which queries may be directed. Thus, as multiple tokens of interest are obtained from, for example, a line or row of text, these tokens may be submitted simultaneously to this query service. Afterwards, the different results returned from the query service for these multiple tokens of interest may be presented together. Other examples of such a query service may include performing spell checks on the tokens, performing map lookups, submitting the tokens to one or more search engines, or the like.

As an example of the foregoing processing, referring briefly back to FIG. 3, assume that the user has selected the token "plumbing" as shown. In response, the reader 100 may present information relating to books that pertain to plumbing in the field 320. This information may be obtained from the local merchant storage unit 414 or the remote merchant website 422, in response to a search performed on the token "plumbing". If the user is interested in any of the plumbing-related books, the user may scroll the cursor 120 to the element 116 corresponding to the field 320 and select a given book. The reader 100 may then present more detailed information about one or more plumbing-related books, and the foregoing processing may be repeated to enable the user to select one of the books for further review, and possibly for purchase.

In this manner, the reader 100 may enable the user to first read sample text 108 that contains a reference to a topic of interest, such as plumbing. The reader may then enable the reader to obtain further information on the topic of interest, using the aggregated search and selection capabilities described above. As a result of these capabilities, the reader may enable the user to view or purchase further reference material related to the topic of interest, using the same reader. Thus, the user need not employ two different devices to perform all of the foregoing. For example, the user need not set down his or her electronic book reader and access his or her personal computer if he or she wishes to find out more about some topic of interest, or purchase a book relating to the topic of interest.

Having described the above illustrative components of the reader 100, the description now turns to a discussion of an illustrative process flow that may be performed using, for example, the reader. That description is now provided with FIG. 5.

Figure 5:
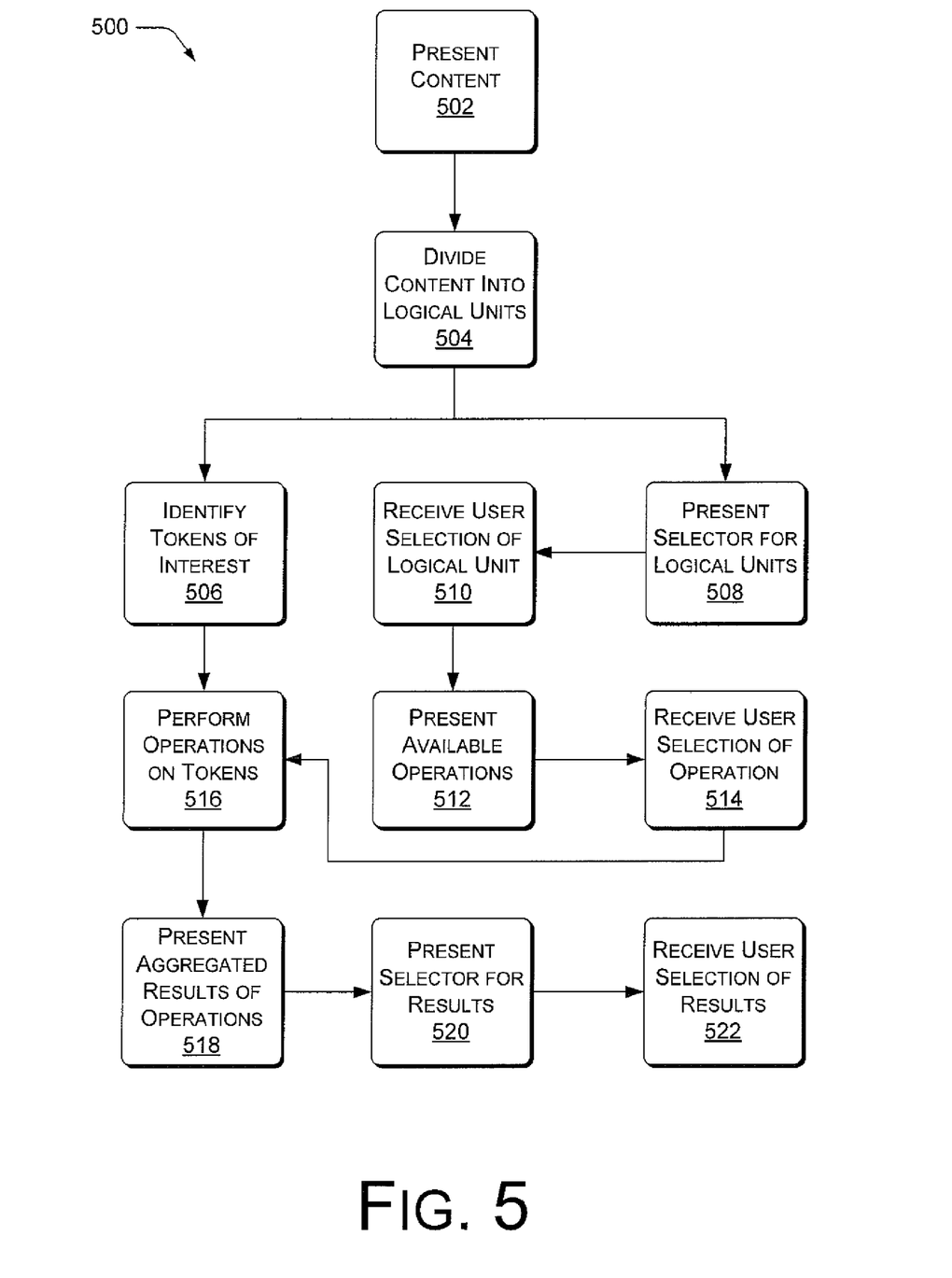
FIG. 5 is a flow diagram of a process that may be performed to obtain aggregated operational results and to enable a user to select from among these aggregated operational results.

FIG. 5 provides a flow diagram of a process 500 that may be performed to obtain aggregated operational results and to enable a user to select from among these aggregated operational results. In describing FIG. 5, it is noted that the order in which the processes are shown is illustrative, and that these processes may be performed on other orders without departing from the scope and spirit of the description herein. Additionally, while FIG. 5 is described in connection with the reader 100 and related components thereof, it is noted that the processes shown in FIG. 5 may be implemented in connection with other devices and related components without departing from the scope and spirit of the description herein.

Turning now to FIG. 5, action block 502 represents presenting content to the user. This content may take textual and/or graphic form, and may include the contents of a book that is read electronically by the user, using a reader such as the reader 100 described herein.

Action block 504 represents dividing the content into a plurality of logical units for presentation to the user. For example, the content may be presented on a display such as the content display 106 illustrated in FIG. 1. Thus, block 504 may include presenting the logical units of the content on such a display, taking into account the physical or performance limitations of the display. Examples of the logical units might include lines of text, paragraphs of text, individual words, or any other suitable subset of the text. For example, action block 504 may result in a display of text presented in horizontal rows, as shown in FIG. 1 with sample text 108.

Action block 506 represents identifying tokens, words, or other individual elements of interest within the logical units of the content. For example, block 506 may include eliminating trivial or non-interesting tokens from the logical units of the content. Thus, words such as "the", "an", "a", or the like are eliminated from further analysis or processing. Afterwards, each logical unit (e.g., row of text) may be associated with one or more corresponding tokens, upon which further operations may be performed, as described below.

Action block 508 represents associating a respective graphic element with the various logical units into which the content is divided. For example, block 508 may include creating a plurality of such graphic elements, and aligning them alongside a display of the logical elements, so that the relationship therebetween is visually apparent to the user. An example is shown in FIG. 1, where the lines 118 associate the rows of the sample text 108 with the corresponding elements 116 in the column 114A.

It is also noted that FIG. 5 shows block 506 proceeding in parallel with a set of other block beginning with block 508. This arrangement is shown for convenience of description, and not to limit possible implementations of the description herein.

Action block 510 represents receiving a user selection of one of the logical units for further processing. For example, in FIG. 1, the user may provide input via a selection device 122, which may moves a cursor 120 sequentially along each of the elements 116, until the cursor is alongside the element desired by the user. In this example, block 510 may represent receiving a user selection of a given row of text, from the sample text 108.

Action block 512 represents presenting processing operations to the user. These processing operations may be presented in menu form, and a graphical representation of the menu may be overlaid onto a presentation of the content, using the same display hardware. The processing operations may be performed on the selected logical unit. More particularly, the processing operations may be performed on each token of interest within the selected logical unit. FIG. 2 illustrates several examples of such operations, such as inserting a bookmark, performing lookups, highlighting, or the like. In the example shown in FIG. 2, the processing operations are presented in connection with the line of text "describe plumbing".

Action block 512 may also include providing one or more graphic elements to aid the user in selecting from among the available processing operations. For example, FIG. 2 illustrates how the elements 116 in column 114A may be adapted to correspond to the three example processing operations shown therein.

Action block 514 represents receiving a user selection of one of the operations presented in block 512. For example, FIG. 2 illustrates how the cursor 120 may be positionable alongside one of the elements 116 so as to select the processing operation corresponding to that element 116. In the example shown in FIGS. 2 and 3, the user has selected to perform a lookup operation on the row of text containing the terms "describe plumbing".

Action block 516 represents performing the selected operation on the selected logical unit. Recall that the operation was selected in block 514 and the logical unit was selected in block 510. More particularly, block 516 may include performing the selected operation for each token of interest within the selected logical unit. Accordingly, block 516 may include performing the selected operation for each token, and combining or aggregating the results obtained for each token for later display.

Action block 518 represents presenting the aggregated or combined results of performing the selected operation for each token to the user. For example, in but one possible implementation, block 518 may result in a display such as that shown in FIG. 3 at 204.

Action block 520 represents presenting one or more graphic elements that enable the user to select one of the results from the aggregated results presented in block 518. For example, FIG. 3 illustrates how the elements 116 may correspond to the various areas and fields shown in block 204. Recall that these various areas and fields may correspond to different types of results presented in the aggregated results.

Action block 522 represents receiving a user selection of one of the aggregated results presented in block 518. For example, FIG. 3 illustrates how the cursor 120 may be positioned in relation to the elements 116. The user may select one of the aggregated results by positioning the cursor alongside the element 116 that corresponds to the desired result.

Figure 6:
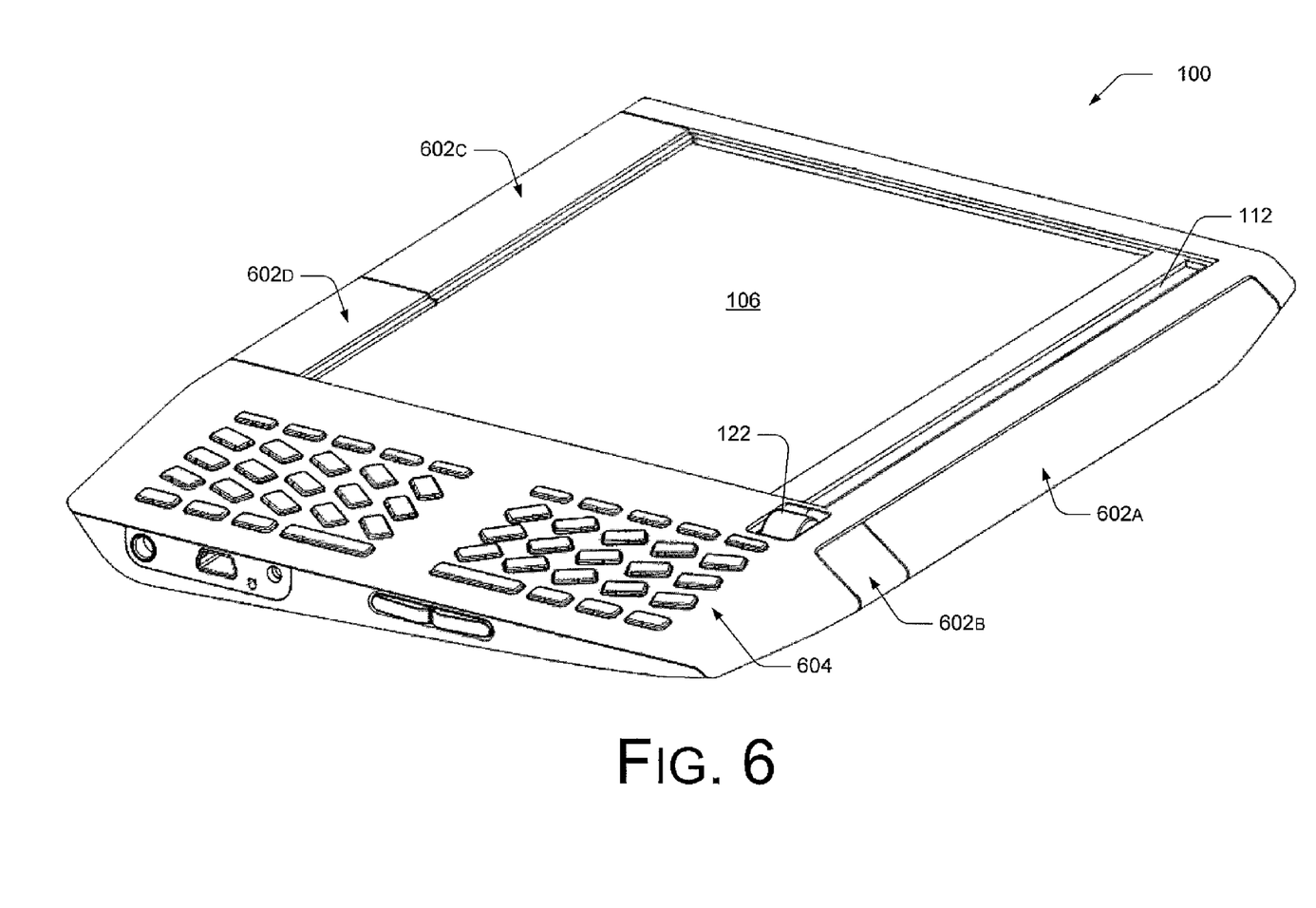
FIG. 6 is a perspective view of the reader, showing features of the reader that are visible externally.

FIG. 6 provides a perspective view of but one possible implementation of the reader 100. As shown in FIG. 6, the content display 106 is visible, as are the control display 112 and the selection device 122. Additionally, the reader 100 as shown in FIG. 6 may include one or more programmable buttons 602. For convenience only, but not limitation, four programmable buttons 602a, 602B, 602C, and 602D are shown in FIG. 6. In some implementations, one or more of these buttons 602 may be programmed to select an item that is placed in focus using the selection device 122, for example, by enabling the user to click the buttons. In addition, one or more of the keys included in the keyboard 604 may be configured to select the item placed in focus.

It is understood that the arrangement of the reader and the related components are shown in FIG. 6 only as an example, and not to limit possible implementations of the reader.

CONCLUSION

Although the handheld electronic book device has been described in language specific to structural features, it is to be understood that the handheld electronic book device defined in the appended claims is not necessarily limited to the specific features described. Rather, the specific features are disclosed as exemplary forms of implementing the claimed handheld electronic book device.

What is claimed is:

1. A handheld electronic book reader comprising:
a content store to store textual or graphic content for display on the handheld electronic book reader;
a housing;
a content display screen, disposed within the housing, to present at least a portion of the textual or graphic content in a plurality of rows; and
a control display screen, separate from the content display screen and also disposed within the housing, to present a plurality of graphic elements that are arranged in a first column, wherein the graphic elements correspond to the rows;
wherein the control display screen further presents a cursor that is positionable within a second column that is parallel to the first column; and
a selection device responsive to user input to position the cursor within the second column, wherein the selection device is for aligning the cursor alongside one of the graphic elements to place a corresponding one of the rows in focus.

2. The handheld electronic book reader of claim 1, further comprising a processor coupled to the content display screen, the control display screen, the content store, and the selection device.

3. The handheld electronic book reader of claim 1, wherein the selection device is a thumbwheel having a click function that is activated by pressing the thumbwheel.

4. The handheld electronic book reader of claim 1, wherein the selection device is for selecting the corresponding row.

5. The handheld electronic book reader of claim 1, further comprising at least a further selection device for selecting the corresponding row.

6. The handheld electronic book reader of claim 5, wherein the further selection device includes a programmable button.

7. An electronic device comprising:
a housing;
a first screen, disposed within the housing, that includes a content display for presenting content; and
a second screen, disposed within the housing, that includes a control display for enabling selection of a portion of the content on the content display, and for enabling a plurality of respective batch operations to be performed on a plurality of items, the second screen being separate from the first screen; and
wherein the control display includes:
a first column that includes a plurality of graphic elements; and
a second column that is parallel to the first column and that includes a cursor that corresponds to at least one graphic element in the first column.

8. The electronic device of claim 7, wherein the content display is for presenting textual content that is arranged in a plurality of lines of text.

9. The electronic device of claim 8, wherein the control display includes graphic elements correspond to the lines of text.

10. The electronic device of claim 7, further comprising a selection device for causing movement of a cursor.

11. The electronic device of claim 7, wherein the content display is for presenting graphic representations of a plurality of processing options that may be performed on one of the plurality of items.

12. The electronic device of claim 11, wherein the control display is for presenting a plurality of graphic elements that are arranged in a first column, and wherein the graphic elements are updated in response to presentation of the graphic representations on the content display.

13. The electronic device of claim 7, wherein the content display is for presenting results of a lookup operation performed on one of the plurality of items.

14. The electronic device of claim 13, wherein the lookup operation is performed on at least one token of interest that appears within the plurality of items.

15. The electronic device of claim 14, wherein the content display is for presenting aggregated results of the repeated lookup operation.

16. The electronic device of claim 13, wherein the lookup operation is repeated for a plurality of tokens of interest that appears within the plurality of items.

17. An electronic device comprising:
a housing;
a first screen, disposed within the housing, that includes a content display for presenting textual or graphic content, wherein the content is presented in a plurality of logical units;
a second screen, disposed within the housing, that includes a control display for presenting a plurality of graphic elements, wherein the graphic elements correspond to the logical units, wherein the graphic elements are arranged in a first column within the control display, and wherein the control display includes a cursor that is positionable within a second column that is parallel to the first column and within the control display, the second screen being separate from the first screen;
a selection device for causing movement of the cursor in response to user input; and
a processor for providing output to the user via the content display and the control display, and for receiving user input via the selection device.

18. The electronic device of claim 17, further comprising a network interface for communicating with at least one external source of data.

19. The electronic device of claim 17, wherein the control display is for enabling a plurality of respective batch operations to be performed on the logical units presented on the content display.

20. The electronic device of claim 17, further comprising at least one reference work that is accessible to the processor, and wherein the processor is for providing aggregated content on the content display that is based, at least in part, on information obtained from the reference work.

21. The electronic device of claim 17, further comprising a dictionary that is accessible to the processor, and wherein the processor is for providing aggregated content on the content display that is based, at least in part, on information obtained from the dictionary.

22. The electronic device of claim 21, wherein the dictionary is hosted locally on the reader.

23. The electronic device of claim 21, wherein the dictionary is hosted remotely from the reader.

24. The electronic device of claim 17, further comprising an encyclopedia that is accessible to the processor, and wherein the processor is for providing aggregated content on the content display that is based, at least in part, on information obtained from the encyclopedia.

25. The electronic device of claim 24, wherein the encyclopedia is hosted locally on the reader.

26. The electronic device of claim 24, wherein the encyclopedia is hosted remotely from the reader.

27. The electronic device of claim 17, further comprising a source of merchant information that is accessible to the processor, and wherein the processor is for providing aggregated content on the content display that is based, at least in part, on the merchant information.

28. The electronic device of claim 27, wherein the merchant information is hosted locally on the reader.

29. The electronic device of claim 27, wherein the merchant information is hosted remotely from the reader.

30. A method executable at least in part by an electronic device, the method comprising at least:
  presenting content that is divided into a plurality of logical units on a content display on a first screen disposed within a housing;
  presenting a plurality of selectors in a first column of a control display on a second screen that is disposed within the housing and that is separate from the first screen, wherein each of the selectors corresponds to one of the logical units;
  receiving a selection of one of the logical units on the content display using a cursor located in a second column of the control display;
  performing an operation on a token appearing in the selected logical unit based at least in part on the receiving of the selection; and
  repeating the operation for at least a further token appearing in the selected logical unit.

31. The method of claim 30, further comprising presenting aggregated results of the operation and the repeated operation.

32. The method of claim 30, wherein performing an operation includes submitting the token and the further token to a query service.

33. The method of claim 30, wherein performing an operation includes performing a lookup operation on the token, and wherein repeating the operation includes performing at least a further lookup operation on the further token.

34. The method of claim 33, further comprising presenting aggregated results of the lookup operation and the further lookup operation.

35. The method of claim 30, wherein performing an operation includes performing a dictionary lookup on a first word appearing in a row of text, and wherein repeating the operation includes performing at least a further dictionary lookup operation on at least a further word appearing in the row of text.

36. The method of claim 35, further comprising presenting respective dictionary definitions of the first word and the further word.

37. The method of claim 30, wherein presenting content includes presenting textual or graphic content.

38. The method of claim 30, wherein the logical units are lines of text.

39. The method of claim 30, further comprising presenting a plurality of graphic elements representing a plurality of operations that are available to be performed on the selected logical unit.

40. The method of claim 39, wherein the operation is one of the plurality of operations represented by the graphic elements.

41. The method of claim 39, further comprising receiving a user selection of one of the plurality of operations.

42. The method of claim 30, further comprising identifying at least one token of interest from a plurality of tokens that appear in the selected logical unit.

43. The method of claim 42, wherein identifying at least one token of interest includes processing the plurality of tokens against an exclusion list.

\* \* \* \* \*